United States Patent
Tran et al.

(10) Patent No.: US 11,828,986 B2
(45) Date of Patent: Nov. 28, 2023

(54) OPTICAL RECEPTACLE AND METHOD OF MANUFACTURING THE SAME

(71) Applicant: FUJIKURA LTD., Tokyo (JP)

(72) Inventors: Hau Huu Tran, Sakura (JP); Satoshi Shida, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 17/801,125

(22) PCT Filed: Nov. 4, 2020

(86) PCT No.: PCT/JP2020/041156
§ 371 (c)(1),
(2) Date: Aug. 19, 2022

(87) PCT Pub. No.: WO2021/171706
PCT Pub. Date: Sep. 2, 2021

(65) Prior Publication Data
US 2023/0082843 A1    Mar. 16, 2023

(30) Foreign Application Priority Data
Feb. 28, 2020 (JP) ................... 2020-033564

(51) Int. Cl.
*G02B 6/255* (2006.01)
*G02B 6/38* (2006.01)
*G02B 6/12* (2006.01)

(52) U.S. Cl.
CPC .. *G02B 6/2551* (2013.01); *G02B 2006/12192* (2013.01)

(58) Field of Classification Search
CPC .. G02B 6/2551; G02B 6/2846; G02B 6/3861; G02B 2006/12192
See application file for complete search history.

(56) References Cited

U.S. PATENT DOCUMENTS

| 5,732,170 A | * | 3/1998 | Okude | G02B 6/02209 385/124 |
| 8,550,728 B2 | * | 10/2013 | Takahashi | G02B 6/2551 219/544 |
| 2018/0267243 A1 | | 9/2018 | Nhep et al. | |

FOREIGN PATENT DOCUMENTS

| JP | 2005208113 A | 8/2005 |
| JP | 2007226120 A | 9/2007 |
| JP | 2019113597 A | 7/2019 |
| JP | 2019128466 A | 8/2019 |

* cited by examiner

*Primary Examiner* — Ryan A Lepisto
(74) *Attorney, Agent, or Firm* — Osha Bergman Watanabe & Burton LLP

(57) ABSTRACT

An optical receptacle includes: a first optical fiber; a second optical fiber connected to the first optical fiber by fusion splice; a ferrule including a fiber hole that holds an end of the first optical fiber; and a housing portion that houses therein: the ferrule, the first optical fiber, and a first portion of the second optical fiber. A fusion splice portion between the first optical fiber and the second optical fiber is disposed outside of the ferrule and within the housing portion.

4 Claims, 4 Drawing Sheets

OPTICAL RECEPTACLE AND METHOD OF MANUFACTURING THE SAME

TECHNICAL FIELD

The present invention relates to an optical receptacle and a method of manufacturing the same, and more particularly to an optical receptacle to which an optical connector plug is connectable.

BACKGROUND

In this type of an optical receptacle, fusion splicing may be used to connect different kinds of optical fibers to each other. Particularly, when two optical fibers having different mode field diameters are connected to each other by fusion splice, a fusion splice portion may be heated such that a dopant doped in a core is thermally diffused into a cladding in order to reduce connection loss (TEC). The strength of a fusion splice portion that has been subject to such a TEC process is reduced as compared to other portions. Therefore, for example, a fusion splice portion may be located within a ferrule to strengthen the fusion splice portion (see, e.g., Patent Literature 1).

In this case, if a fusion splice portion that has been subject to a TEC process has an outside diameter greater than an inside diameter of a fiber hole of a ferrule, then the fusion splice portion interferes with the fiber hole of the ferrule when the fusion splice portion is to be inserted into the fiber hole. Therefore, the outside diameter of the fusion splice portion should be smaller than the inside diameter of the fiber hole of the ferrule. Accordingly, for an optical connector part disclosed in Patent Literature 1, there has been proposed to heat and stretch the fusion splice portion in order to reduce the outside diameter of the fusion splice portion. However, when the outside diameter of the fusion splice portion is thus reduced, the strength of the fusion splice portion may further be reduced. Furthermore, it is problematically difficult to control an outside diameter of a fusion splice portion with accuracy.

PATENT LITERATURE

[Patent Literature 1] JP 2005-208113 A

SUMMARY

One or more embodiments of the present invention provide an optical receptacle capable of protecting a fusion splice portion of optical fibers at low cost with ease.

Furthermore, one or more embodiments of the present invention provide a method of manufacturing an optical receptacle including a fusion splice portion of optical fibers at low cost with ease.

According to one or more embodiments of the present invention, there is provided an optical receptacle capable of protecting a fusion splice portion of optical fibers at low cost with ease. The optical receptacle has a first optical fiber, a second optical fiber connected to the first optical fiber by fusion splice, a ferrule having a fiber hole that holds an end of the first optical fiber, and a housing portion that at least houses therein the ferrule, the first optical fiber, and a portion of the second optical fiber. A fusion splice portion between the first optical fiber and the second optical fiber is located outside of the ferrule and within the housing portion.

According to one or more embodiments of the present invention, there is provided a method of manufacturing an optical receptacle including a fusion splice portion of optical fibers at low cost with ease. In this method, a first optical fiber and a second optical fiber are connected to each other by fusion splice. A ferrule assembly including a ferrule having a fiber hole formed therein and a ferrule flange that holds the ferrule is prepared. An end of the first optical fiber is inserted to the fiber hole of the ferrule so that a fusion splice portion between the first optical fiber and the second optical fiber is located outside of the ferrule and within the ferrule flange. A receptacle flange having an insertion hole formed therein is attached to the ferrule assembly in which the end of the first optical fiber has been inserted to the fiber hole of the ferrule. An optical connector plug is to be inserted to the insertion hole.

DETAILED DESCRIPTION

Figure 1:
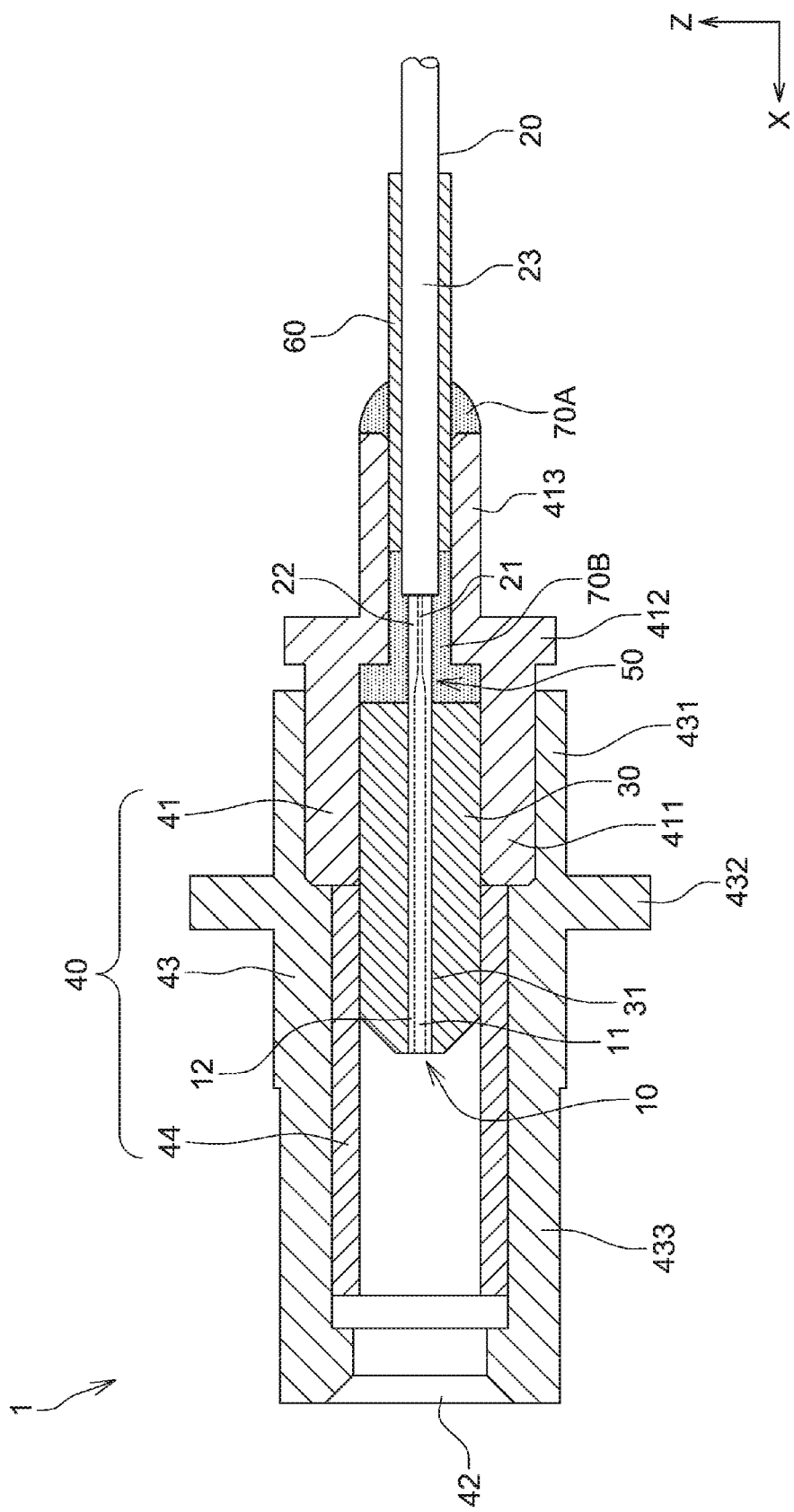
FIG. 1 is a cross-sectional view schematically showing an optical receptacle according to one or more embodiments of the present invention.
Figure 2A:
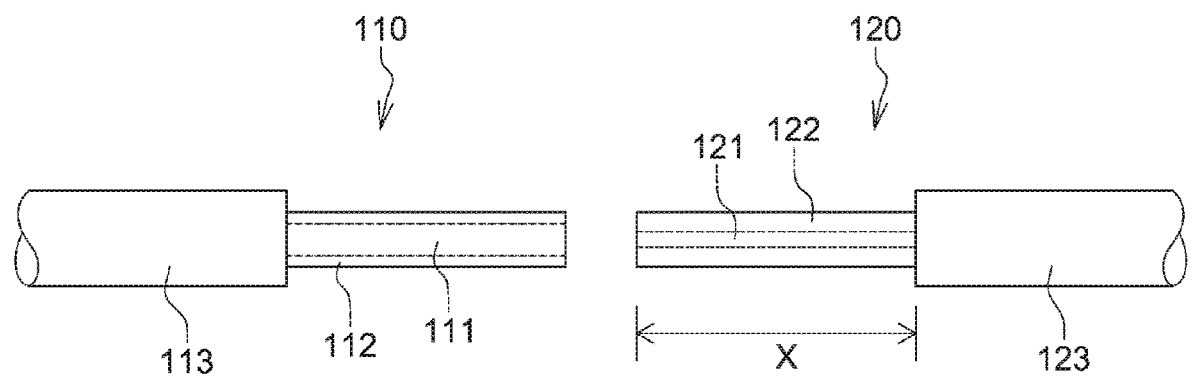
FIG. 2A is a schematic diagram explanatory of a process of manufacturing the optical receptacle illustrated in FIG. 1.

Embodiments of an optical receptacle according to the present invention will be described in detail below with reference to FIGS. 1 to 2F. In FIGS. 1 to 2F, the same or corresponding components are denoted by the same or corresponding reference numerals and will not be described below repetitively. Furthermore, in FIGS. 1 to 2F, the scales or dimensions of components may be exaggerated, or some components may be omitted. Unless mentioned otherwise, in the following description, terms such as "first," "second," etc. are only used to distinguish one component from another and are not used to indicate a specific order or a specific sequence.

FIG. 1 is a cross-sectional view schematically showing an optical receptacle 1 according to one or more embodiments of the present invention. As shown in FIG. 1, the optical receptacle 1 of one or more embodiments has an optical fiber 10 (first optical fiber) disposed at a side to which an optical connector plug (not shown) is to be connected (+X side), an optical fiber 20 (second optical fiber) connected to the optical fiber 10 by fusion splice, a ferrule 30 having fiber hole 31 formed therein to hold an end of the optical fiber 10, and a housing portion 40 that at least houses therein the ferrule 30, the optical fiber 10, and a portion of the optical fiber 20. The optical fiber 10 and the optical fiber 20 are connected to each other at a fusion splice portion 50 by fusion splice. For example, the ferrule 30 is formed of zirconia ceramics or glass. In one or more embodiments, for the sake of convenience, the term "front" or "front side" refers to +X-direction in FIG. 1, and the term "rear" or "rear side" refers to −X-direction in FIG. 1.

The optical fiber 10 includes a core 11 and a cladding 12 surrounding a circumference of the core 11. The cladding 12 has a refractive index lower than a refractive index of the core 11. Thus, a light waveguide is formed in the core 11. The optical fiber 10 extends within the fiber hole 31 of the ferrule 30 from a rear side of the ferrule 30 toward a front side of the ferrule 30. The optical fiber 10 has a front end held within the fiber hole 31 of the ferrule 30.

The optical fiber 20 includes a core 21, a cladding 22 surrounding a circumference of the core 21, and a covering 23 surrounding a circumference of the cladding 22. The cladding 22 has a refractive index lower than a refractive index of the core 21. Thus, a light waveguide is formed in the core 21. The covering 23 is removed on a front end of the optical fiber 20, i.e., near the fusion splice portion 50 so that the cladding 22 is exposed.

In one or more embodiments, the diameter of the core 11 of the optical fiber 10 is greater than the diameter of the core 21 of the optical fiber 20. At the fusion splice portion 50, the core diameter gradually increases in a consecutive manner from the core diameter of the optical fiber 20 to the core diameter of the optical fiber 10. Thus, in one or more embodiments, the mode field diameter of the optical fiber 10 is greater than the mode field diameter of the optical fiber 20. At the fusion splice portion 50, the mode field diameter gradually increases from the mode field diameter of the optical fiber 20 to the mode field diameter of the optical fiber 10. The diameter of the core 11 of the optical fiber 10 may be equal to the diameter of the core 21 of the optical fiber 20. Alternatively, the diameter of the core 11 of the optical fiber 10 may be smaller than the diameter of the core 21 of the optical fiber 20.

When the optical fiber 10 and the optical fiber 20 are connected to each other by fusion splice, the fusion splice portion is heated, for example, by electric discharge. Then a dopant in the core 21 of the optical fiber 20 is diffused, and the optical fiber 10 and the optical fiber 20 are joined to each other such that the mode field diameter of the core 11 of the optical fiber 10 and the mode field diameter of the core 21 of the optical fiber 20 are equal to each other. Accordingly, a diameter of the cladding of the fusion splice portion 50 becomes greater than an outside diameter of any portion of the optical fibers 10 and 20. In order to reduce the cladding diameter of the fusion splice portion 50, the optical fiber 10 and the optical fiber 20 need to be drawn in directions in which the optical fiber 10 and the optical fiber 20 are separated away from each other after being reheated by electric discharge.

The housing portion 40 includes a ferrule flange 41 that holds the ferrule 30 radially inwardly, a receptacle flange 43 having an insertion hole 42 formed therein into which an optical connector plug (not shown) is inserted, and a cylindrical sleeve 44 that holds the optical connector plug that has been inserted through the insertion hole 42 of the receptacle flange 43. Those members may be integrated with each other as needed. Furthermore, the housing portion 40 may further include a reinforcement sleeve (not shown), for example, for reinforcing the optical fiber 20.

The ferrule flange 41 is formed of a material having a high rigidity, such as an alloy steel, for example, stainless steel. The ferrule flange 41 includes a first cylindrical portion 411 located on a radially outward side of the ferrule 30, a flange portion 412 extending radially outward from the first cylindrical portion 411, and a second cylindrical portion 413 extending rearward from the flange portion 412. A protective tube 60 that covers a portion of a circumference of the covering 23 of the optical fiber 20 is disposed on a radially inward side of the second cylindrical portion 413. This protective tube 60 prevents the optical fiber 20 from being damaged when the optical fiber 20 contacts an edge of the second cylindrical portion 413 of the ferrule flange 41 while it is bent or curved. For example, a flexible tube made of Hytrel (registered trademark) or a resilient plastic tube made of nylon may be used for the protective tube 60. For example, the protective tube 60 is fixed to the ferrule flange 41 by a two-part adhesive 70A.

The receptacle flange 43 is attached to a front portion of the ferrule flange 41. The receptacle flange 43 includes a first cylindrical portion 431 on a radially outer side of the first cylindrical portion 411 of the ferrule flange 41, a flange portion 432 extending radially outward from the first cylindrical portion 431, and a second cylindrical portion 433 extending frontward from the flange portion 432. The aforementioned sleeve 44 is arranged on a radially inner side of the second cylindrical portion 433. The sleeve 44 has an inside diameter that is substantially equal to an inside diameter of the first cylindrical portion 411 of the ferrule flange 41. The sleeve 44 is designed such that the outside diameter of the ferrule 30 is fitted into the inside diameter of the sleeve 44. The ferrule 30 is held on a radially inner side of the sleeve 44 and the first cylindrical portion 411 of the ferrule flange 41.

An adhesive 70B is arranged within an internal space of the ferrule flange 41, which is located between the ferrule 30 and the protective tube 60. The fusion splice portion 50 is fixed to the ferrule flange 41 by the adhesive 70B. For example, the adhesive 70B is provided as a high-temperature curing adhesive. Although not illustrated, the adhesive 70B is present between an outer circumferential surface of the optical fiber 10 and an inner circumferential surface of the fiber hole 31 of the ferrule 30 and between an outer circumferential surface of the protective tube 60 and an inner circumferential surface of the second cylindrical portion 413 of the ferrule flange 41.

As shown in FIG. 1, the fusion splice portion 50 between the optical fiber 10 and the optical fiber 20 is located outside (rearward) of the ferrule 30. Therefore, the outside diameter of the fusion splice portion 50 does not need to be reduced so that the fusion splice portion 50 can be inserted into the fiber hole 31 of the ferrule 30 when the optical receptacle 1 is to be assembled. Specifically, a step of drawing the optical fiber 10 and the optical fiber 20 away from each other while reheating the fusion splice portion by electric discharge becomes unnecessary after the optical fiber 10 and the optical fiber 20 are connected to each other by fusion splice. Accordingly, a step of assembling the optical receptacle 1 is simplified, and a manufacturing cost of the optical receptacle 1 is reduced.

The fusion splice portion 50 is located within the housing portion 40, i.e., within the ferrule flange 41 in one or more embodiments. Thus, the fusion splice portion 50, which has a low strength, can be protected by the ferrule flange 41, which has a high rigidity. Therefore, a separate member such as a protective sleeve is not required to reinforce the fusion splice portion 50. Accordingly, a manufacturing cost of the optical receptacle 1 can be reduced. Particularly, the fusion splice portion 50 is fixed to the ferrule flange 41 by the adhesive 70B in one or more embodiments. Therefore, the adhesive 70B can provide greater protection to the fusion splice portion 50.

In the example shown in FIG. 1, the fusion splice portion 50 is located outside of the protective tube 60. Nevertheless, the fusion splice portion 50 may be located inside of the protective tube 60. In this case, the fusion splice portion 50 is protected not only by the ferrule flange 41, but also by the protective tube 60. Therefore, the fusion splice portion 50 can be protected more effectively.

Now a method of manufacturing such an optical receptacle will be described with reference to FIGS. 2A to 2F. First, as shown in FIG. 2A, two optical fibers 110 and 120 are prepared. For example, the optical fiber 110 includes a core 111 to which germanium (Ge) has been doped, a cladding 112 surrounding a circumference of the core 111, and a covering 113 surrounding a circumference of the cladding 112. For example, the optical fiber 120 includes a core 121 to which germanium (Ge) has been doped, a cladding 122 surrounding a circumference of the core 121, and a covering 123 surrounding a circumference of the cladding 122. In one or more embodiments, the core 111 of the optical fiber 110 has a diameter greater than a diameter of the core 121 of the optical fiber 120. As shown in FIG. 2A, the covering 113 is removed from an end of the optical fiber 110 over a certain length so as to expose the cladding 112, and the covering 123 is removed from an end of the optical fiber 120 over a certain length (X [mm]) so that the cladding 122 is exposed.

Figure 2B:
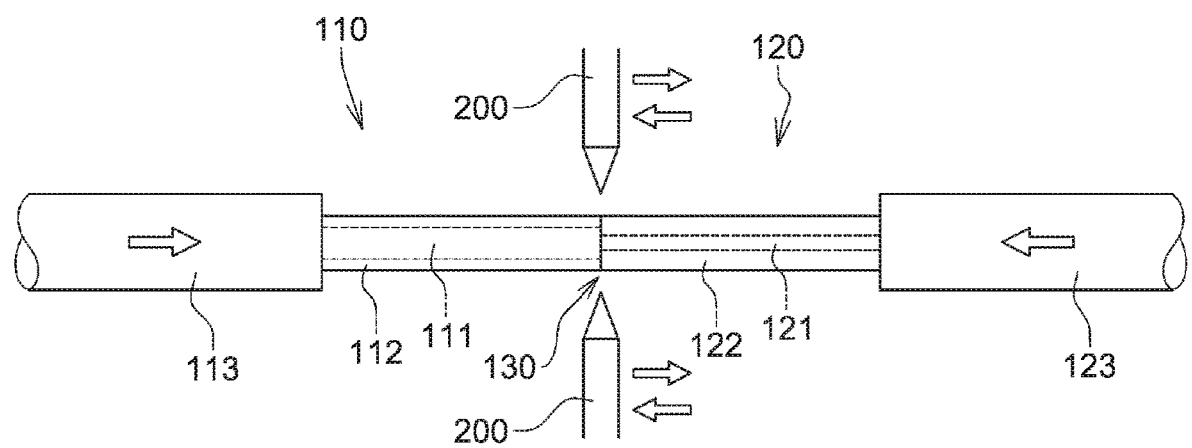
FIG. 2B is a schematic diagram explanatory of a process of manufacturing the optical receptacle illustrated in FIG. 1.

Then, as shown in FIG. 2B, the end of the optical fiber 110 where the cladding 112 is exposed and the end of the optical fiber 120 where the cladding 122 is exposed are abutted against each other and pressed from opposite sides of the optical fibers 110 and 120. While the optical fibers 110 and 120 are pressed against each other, an abutted portion 130 of the optical fibers 110 and 120 are heated from around the optical fibers 110 and 120, for example, with use of an electrode 200 for arc discharge, a burner, or the like. At that time, the electrode 200 for arc discharge is moved from the abutted portion 130 toward the optical fiber 120 in a reciprocated manner.

Figure 2C:
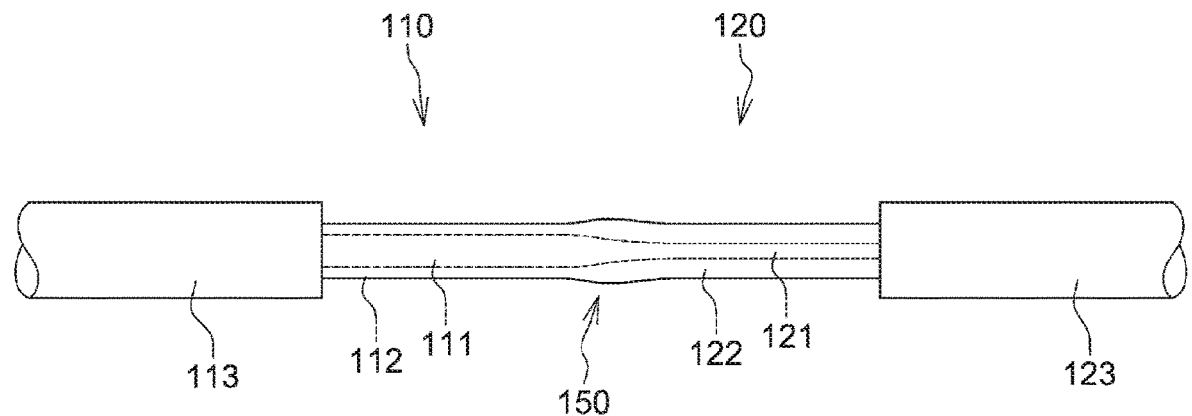
FIG. 2C is a schematic diagram explanatory of a process of manufacturing the optical receptacle illustrated in FIG. 1.

The heating causes fusion splice to connect the optical fiber 110 and the optical fiber 120 to each other at a fusion splice portion 150 as shown in FIG. 2C. At that time, germanium doped in the core 121 of the optical fiber 120 is thermally diffused to the cladding 122 so as to expand the core 121 of the optical fiber 120 (TEC process). Thus, the core diameter of the optical fibers 110 and 120 gradually increases in a consecutive manner from the core diameter of the optical fiber 120 to the core diameter of the optical fiber 110 at the fusion splice portion 150. Accordingly, the mode field diameter of the optical fiber 110 also gradually increases from the optical fiber 120 to the optical fiber 110 at the fusion splice portion 150 of the optical fibers 110 and 120. Therefore, connection loss is reduced at the fusion splice portion 150. Since the optical fibers 110 and 120 are heated while they are pressed from opposite sides, the fusion splice portion 150 of the optical fibers 110 and 120 slightly swells radially outward.

Figure 2D:
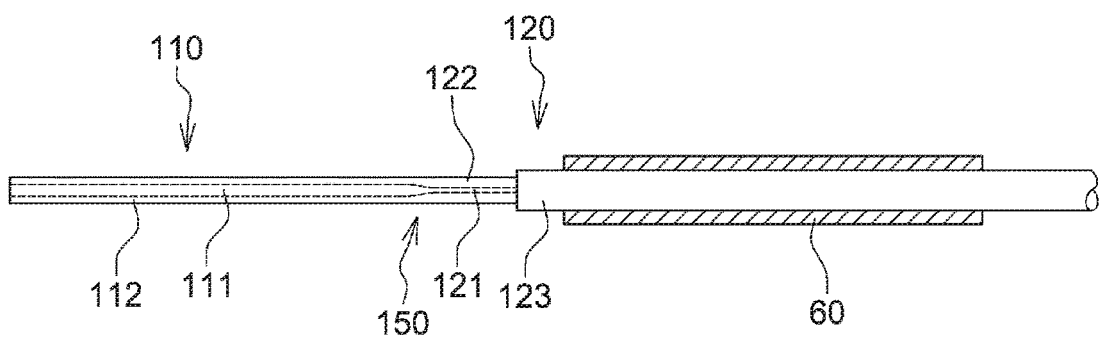
FIG. 2D is a schematic diagram explanatory of a process of manufacturing the optical receptacle illustrated in FIG. 1.

Next, as shown in FIG. 2D, all of the covering 113 of the optical fiber 110 that covers the cladding 112 is removed, and the optical fiber 110 is cut with a certain length from the fusion splice portion 150. Then the aforementioned protective tube 60 is attached around the covering 123 of the optical fiber 120.

Figure 2E:
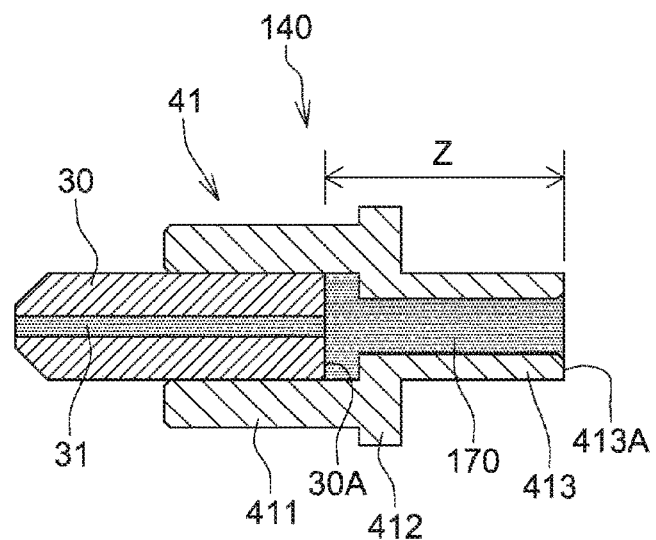
FIG. 2E is a schematic diagram explanatory of a process of manufacturing the optical receptacle illustrated in FIG. 1.
Figure 2F:
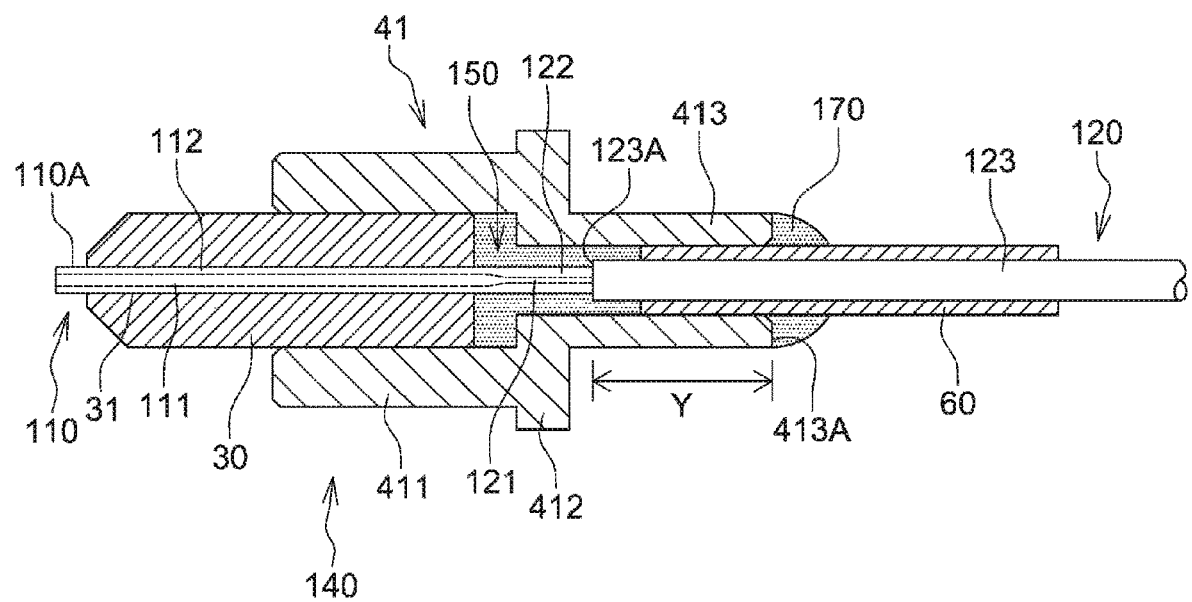
FIG. 2F is a schematic diagram explanatory of a process of manufacturing the optical receptacle illustrated in FIG. 1.

Meanwhile, as shown in FIG. 2E, the ferrule 30 is attached to the aforementioned ferrule flange 41 to prepare a ferrule assembly 140. Then an end of the ferrule flange 41 near the second cylindrical portion 413 is immersed in an adhesive bath (not shown). In this state, air is evacuated through the fiber hole 31 of the ferrule 30 to fill an adhesive 170 in the fiber hole 31 of the ferrule 30 and an internal space of the ferrule flange 41 as shown in FIG. 2E.

The aforementioned optical fibers 110, 120 and protective tube 60 are attached to the ferrule assembly 140. Specifically, as shown in FIG. 2F, the optical fiber 110 is inserted to the fiber hole 31 of the ferrule 30 until a distance from a front end face 123A of the covering 123 of the optical fiber 120 to a rear end face 413A of the second cylindrical portion 413 of the ferrule flange 41 reaches a predetermined value (Y [mm]). The predetermined value Y is defined such that Y<Z−X where Z [mm] is a distance from a rear end face 30A of the ferrule 30 to a rear end face 413A of the second cylindrical portion 413 of the ferrule flange 41 (see FIG. 2E). Thus, the aforementioned fusion splice portion 150 of the optical fibers 110 and 120 is located outside of the ferrule 30 and within the ferrule flange 41.

At that time, as shown in FIG. 2F, the fusion splice portion 150 of the optical fibers 110 and 120 is surrounded by the adhesive 170 in the internal space of the ferrule flange 41. Furthermore, a portion of the adhesive 170 leaks out of a rear end of the second cylindrical portion 413 in the ferrule flange 41. In this state, the adhesive 170 is cured to fix the optical fibers 110 and 120 to the ferrule assembly 140.

Next, a front end of the ferrule 30 is polished to remove a front end 110A of the optical fiber 110 that projects frontward from the ferrule 30 (see FIG. 2F). Then a receptacle flange 43 to which a sleeve 44 has been attached is attached to the ferrule assembly 140 to which optical fibers 110 and 120 have been attached, so that the optical receptacle 1 illustrated in FIG. 1 is completed. Specifically, the optical fibers 110 and 120 correspond to the optical fibers 10 and 20 illustrated in FIG. 1, respectively. The fusion splice portion 150 of the optical fibers 110 and 120 corresponds to the fusion splice portion 50 illustrated in FIG. 1. The adhesive 170 corresponds to the adhesives 70A and 70B illustrated in FIG. 1.

As described above, when the optical fiber 110 and the optical fiber 120 are connected to each other by fusion splice, the fusion splice portion 150 slightly swells radially outward (see FIG. 2C). If the fusion splice portion 150 is located and protected within the ferrule 30 in the conventional manner, the fusion splice portion 150 needs to be reheated and stretched to reduce the outside diameter of the fusion splice portion 150 after the aforementioned fusion splicing process while the optical fibers 110 and 120 are drawn in opposite directions. In one or more embodiments, however, the fusion splice portion 150 between the optical fiber 110 and the optical fiber 120 is located outside of the ferrule 30. Therefore, the optical receptacle 1 can be assembled without control (reduction) of the outside diameter of the fusion splice portion 150. Accordingly, an assembly operation of the optical receptacle 1 is simplified, and a manufacturing cost of the optical receptacle 1 can be reduced. Furthermore, since the fusion splice portion 150 is located within the ferrule flange 41, the fusion splice portion 150, which has a has a low strength, can be protected by the ferrule flange 41, which has a high rigidity.

The terms "front," "rear," and other positional terms described herein are used in connection with the illustrated embodiments and may vary depending on the relative positional relationship between components of the apparatus.

Although some embodiments of the present invention have been described, the present invention is not limited to the aforementioned embodiments. It should be understood that various different forms may be applied to the present invention within the technical idea thereof.

As described above, according to one or more embodiments of the present invention, there is provided an optical receptacle capable of protecting a fusion splice portion of optical fibers at low cost with ease. The optical receptacle has a first optical fiber, a second optical fiber connected to the first optical fiber by fusion splice, a ferrule having a fiber hole that holds an end of the first optical fiber, and a housing portion that at least houses therein the ferrule, the first optical fiber, and a portion of the second optical fiber. A fusion splice portion between the first optical fiber and the second optical fiber is located outside of the ferrule and within the housing portion.

According to such a configuration, the fusion splice portion between the first optical fiber and the second optical fiber is located outside of the ferrule. Therefore, an outside diameter of the fusion splice portion does not need to be controlled when the optical receptacle is to be assembled. Thus, a step of assembling the optical receptacle is simplified. Accordingly, a manufacturing cost of the optical receptacle can be reduced. Furthermore, the fusion splice portion is located within the housing portion. Therefore, the fusion splice portion, which has a low strength, can be protected by the housing portion, and a separate member such as a protective sleeve is not required to reinforce the fusion splice portion. Thus, the fusion splice portion of the optical fibers can be protected at low cost with ease.

The fusion splice portion may be fixed to the housing portion by an adhesive arranged in an internal space formed within the housing portion. With such an adhesive, the fusion splice portion can be protected more effectively.

The optical receptacle may further have a protective tube surrounding a circumference of a portion of the second optical fiber, wherein at least a portion of the protective tube is arranged within the housing portion. Such a protective tube can protect the second optical fiber. In this case, the fusion splice portion may be arranged within the protective tube, so that the fusion splice portion can be protected more effectively by the protective tube.

The first optical fiber may have a first mode field diameter, and the second optical fiber may have a second mode field diameter that is different than the first mode field diameter. In this case, the mode field diameter of the fusion splice portion may gradually vary from the second mode field diameter to the first mode field diameter in a direction from the second optical fiber to the first optical fiber. Furthermore, the first mode field diameter may be greater than the second mode field diameter.

According to one or more embodiments of the present invention, there is provided a method of manufacturing an optical receptacle including a fusion splice portion of optical fibers at low cost with ease. In this method, a first optical fiber and a second optical fiber are connected to each other by fusion splice. A ferrule assembly including a ferrule having a fiber hole formed therein and a ferrule flange that holds the ferrule is prepared. An end of the first optical fiber is inserted to the fiber hole of the ferrule so that a fusion splice portion between the first optical fiber and the second optical fiber is located outside of the ferrule and within the ferrule flange. A receptacle flange having an insertion hole formed therein is attached to the ferrule assembly in which the end of the first optical fiber has been inserted to the fiber hole of the ferrule. An optical connector plug is to be inserted to the insertion hole.

According to this method, the fusion splice portion between the first optical fiber and the second optical fiber is located outside of the ferrule. Therefore, an optical receptacle can be assembled without consideration of an outside diameter of the fusion splice portion. Accordingly, a step of assembling the optical receptacle is simplified, and a manufacturing cost of the optical receptacle can be reduced. Furthermore, the fusion splice portion is located within the ferrule flange. Therefore, the fusion splice portion, which has a low strength, can be protected by the ferrule flange. Accordingly, a separate member such as a protective sleeve is not required to reinforce the fusion splice portion. Thus, the optical receptacle including the fusion splice portion of the optical fibers can be manufactured by an inexpensive and simple process.

This application claims the benefit of priority from Japanese patent application No. 2020-033564, filed on Feb. 28, 2020, the disclosure of which is incorporated herein in its entirety by reference.

The present invention may be used for an optical receptacle to which an optical connector plug is connectable.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1 Optical receptacle
10, 110 (First) optical fiber
11, 21, 111, 121 Core
12, 22, 112, 122 Cladding
20, 120 (Second) optical fiber
23, 113, 123 Covering
30 Ferrule
31 Fiber hole
40 Housing portion
41 Ferrule flange
42 Insertion hole
43 Receptacle flange
44 Sleeve
50, 150 Fusion splice portion
60 Protective tube
70A, 70B, 170 Adhesive
130 Abutted portion
140 Ferrule assembly
200 Electrode for arc discharge
411 First cylindrical portion
412 Flange portion
413 Second cylindrical portion
431 First cylindrical portion
432 Flange portion
433 Second cylindrical portion

The invention claimed is:
1. An optical receptacle comprising:
a first optical fiber having a first mode field diameter;
a second optical fiber having a second mode field diameter that is different from the first mode field diameter;
a ferrule comprising a fiber hole that holds an end of the first optical fiber; and
a housing portion that comprises:
a ferrule flange that directly holds the ferrule, and
a receptacle flange comprising an insertion hole into which an optical connector plug is inserted, wherein
the first and second optical fibers are connected by fusion splice at a fusion splice portion disposed outside of the ferrule and within the ferrule flange that directly holds the ferrule, and
a mode field diameter of the fusion splice portion gradually varies from the second mode field diameter to the first mode field diameter in a direction from the second optical fiber to the first optical fiber.

2. The optical receptacle according to claim 1, further comprising:
a protective tube surrounding a circumference of a second portion of the second optical fiber, wherein
a portion of the protective tube is disposed within the housing portion.

3. The optical receptacle according to claim 1, wherein the first mode field diameter is greater than the second mode field diameter.

4. A method of manufacturing an optical receptacle, the method comprising:
connecting a first optical fiber to a second optical fiber by fusion splice at a fusion splice portion, wherein the first optical fiber has a first mode field diameter and the second optical fiber has a second mode field diameter that is different from the first mode field diameter, and a mode field diameter of a fusion splice portion gradually varies from the second mode field diameter to the first mode field diameter in a direction from the second optical fiber to the first optical fiber;
inserting an end of the first optical fiber into a fiber hole of a ferrule such that the fusion splice portion is disposed outside of the ferrule and within a ferrule flange that directly holds the ferrule;
attaching a receptacle flange comprising an insertion hole to a ferrule assembly comprising the ferrule and the ferrule flange; and
inserting an optical connector plug into the insertion hole.

\* \* \* \* \*